Figure 17:
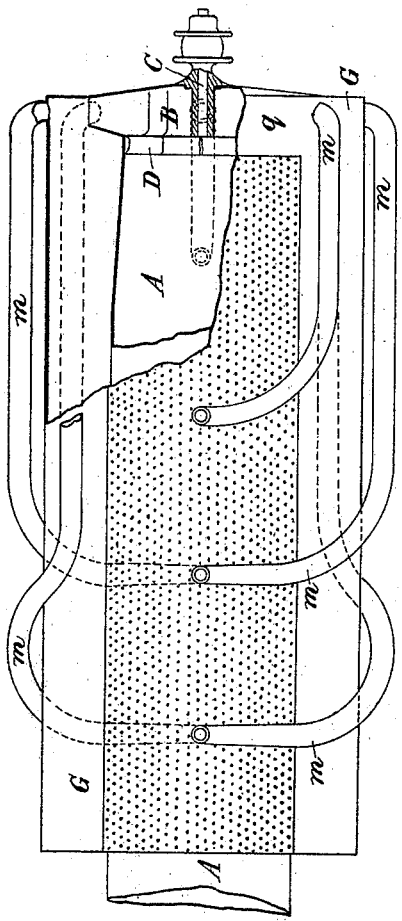

No. 611,480. Patented Sept. 27, 1898.
J. A. HART.
APPARATUS FOR VENTILATING.
(Application filed Apr. 27, 1897.)
(No Model.) 6 Sheets—Sheet 1.
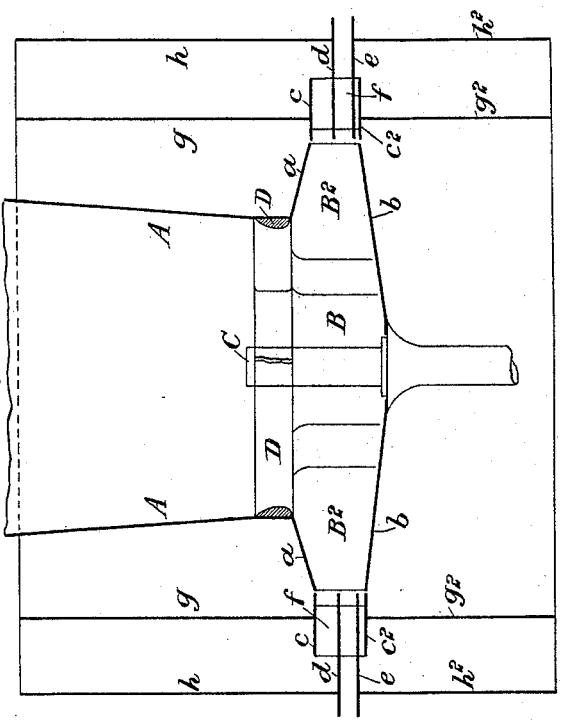
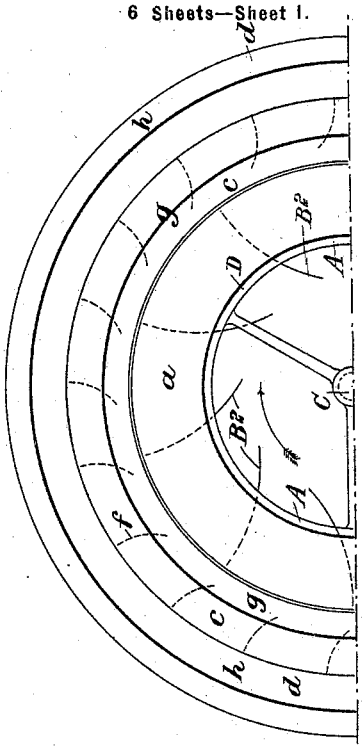
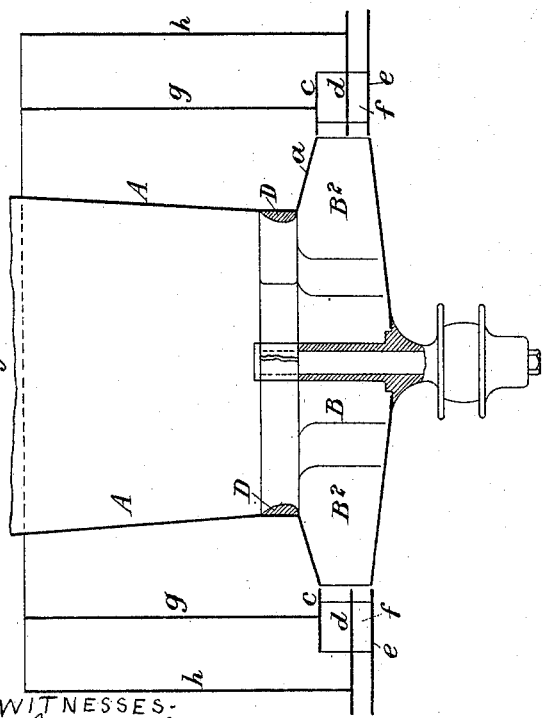
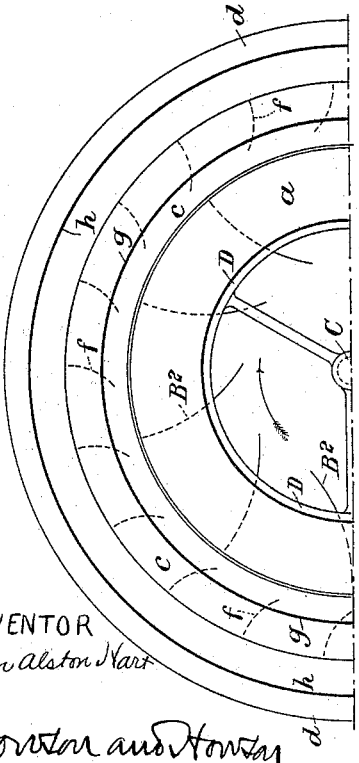
WITNESSES-
INVENTOR
John Alston Hart
BY
Howson and Howson
HIS ATTORNEYS No. 611,480. Patented Sept. 27, 1898.
J. A. HART.
APPARATUS FOR VENTILATING.
(Application filed Apr. 27, 1897.)
(No Model.) 6 Sheets—Sheet 2.
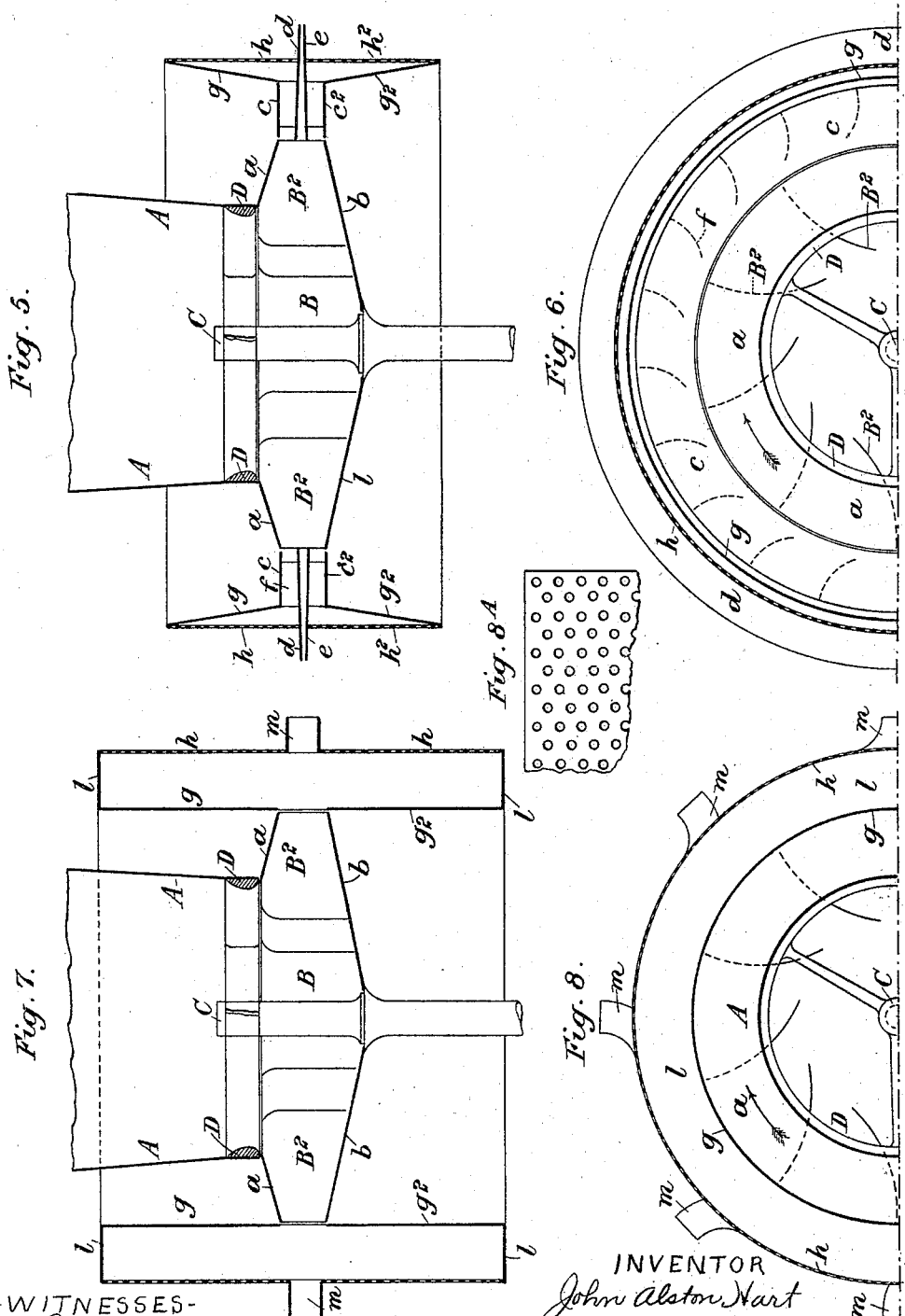
WITNESSES-
J. W. Wright
S. C. Connor
INVENTOR
John Alston Hart
BY
Howson and Howson
HIS ATTORNEYS No. 611,480. Patented Sept. 27, 1898.
J. A. HART.
APPARATUS FOR VENTILATING.
(Application filed Apr. 27, 1897.)
(No Model.) 6 Sheets—Sheet 3.
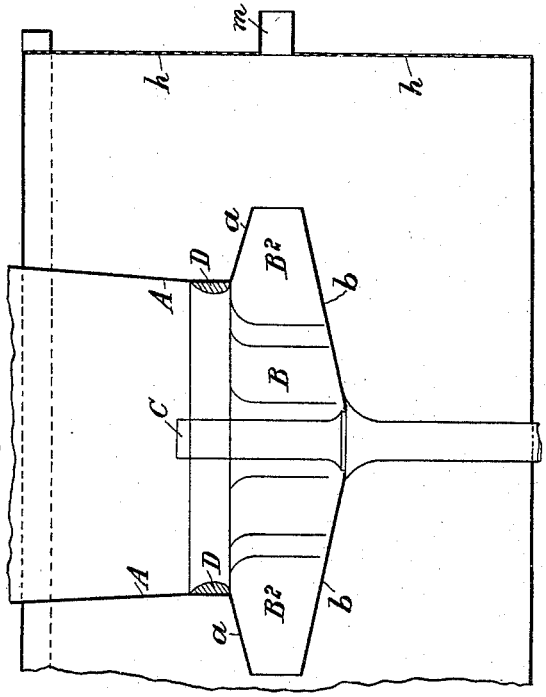
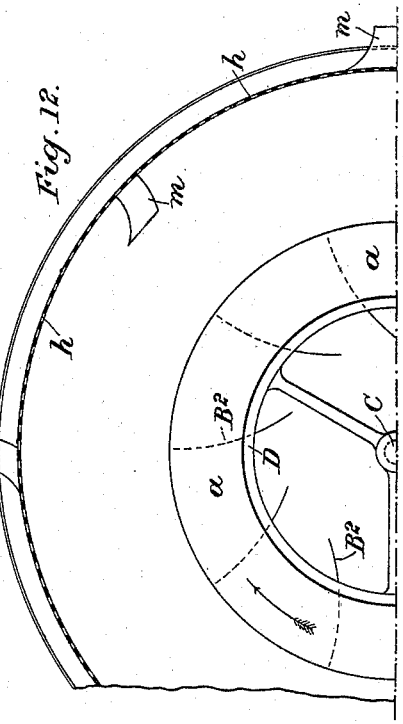
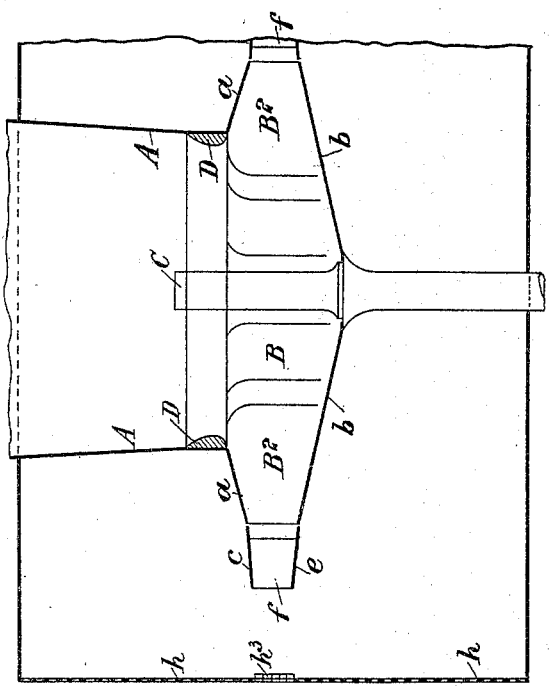
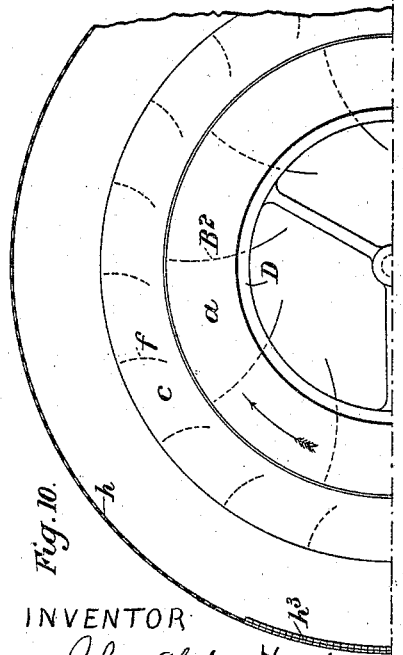

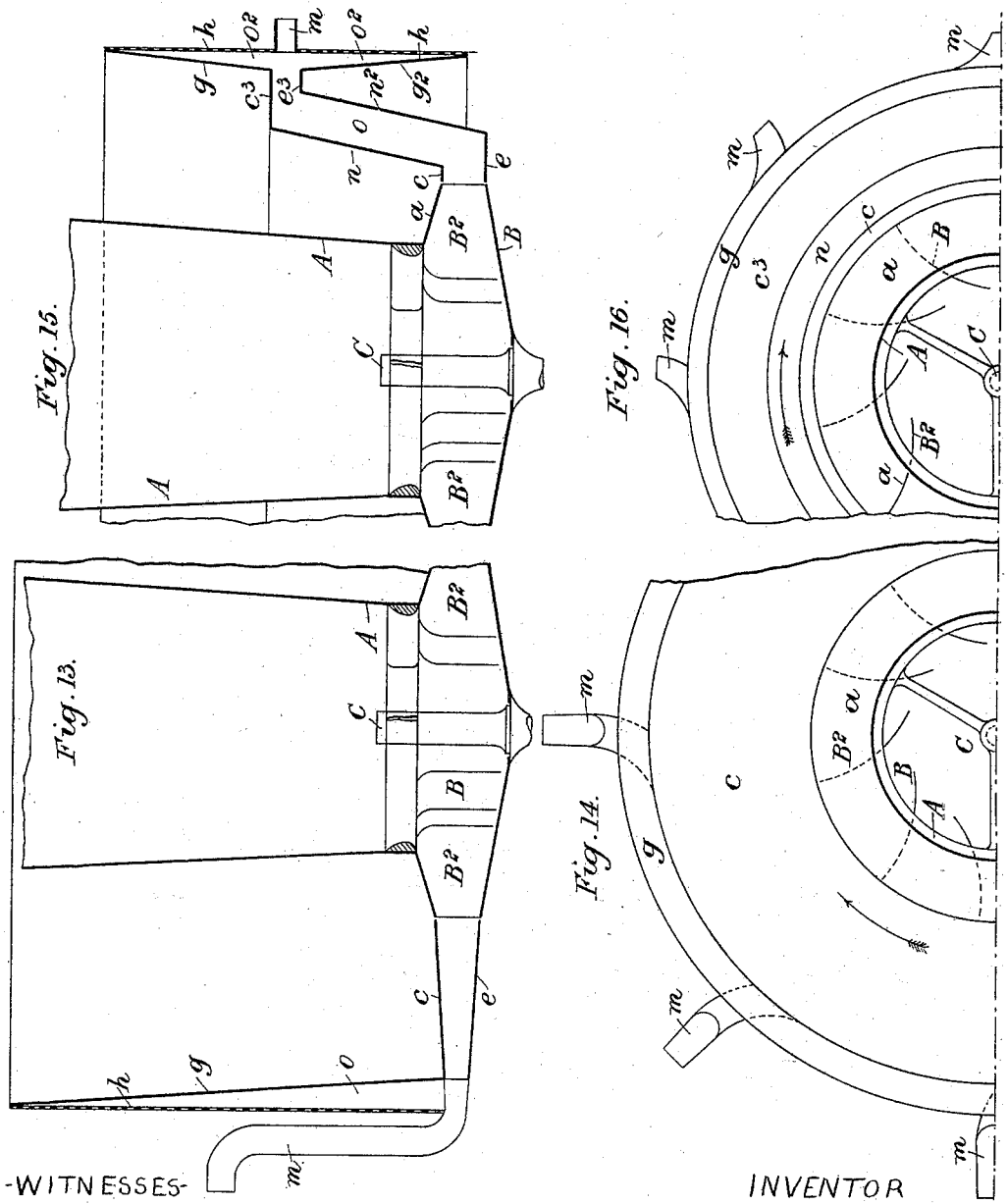

No. 611,480. Patented Sept. 27, 1898.
J. A. HART.
APPARATUS FOR VENTILATING.
(Application filed Apr. 27, 1897.)

(No Model.) 6 Sheets—Sheet 5.

WITNESSES-
F. W. Wright
A. C. Connor

INVENTOR
John Alston Hart
BY
Howson and Howson
HIS ATTORNEYS

THE NORRIS PETERS CO., PHOTO-LITHO., WASHINGTON, D. C.

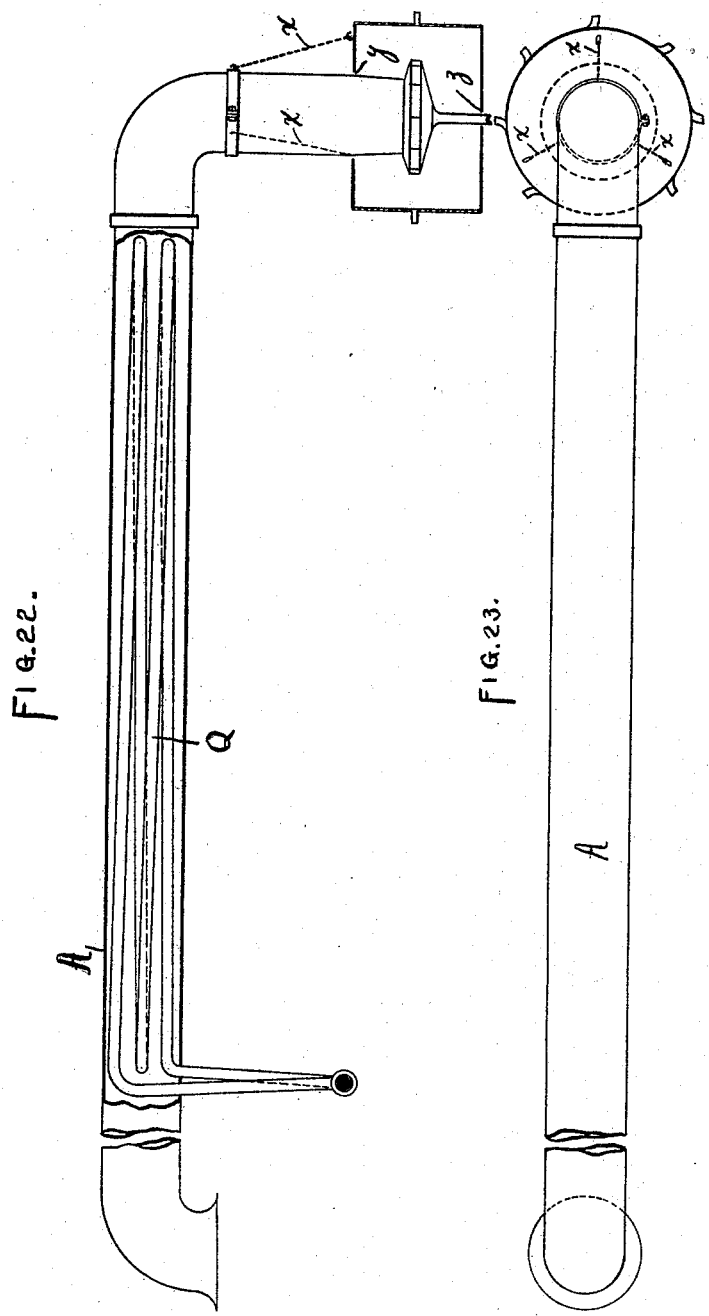

UNITED STATES PATENT OFFICE.

JOHN A. HART, OF BLACKBURN, ENGLAND.

APPARATUS FOR VENTILATING.

SPECIFICATION forming part of Letters Patent No. 611,480, dated September 27, 1898.

Application filed April 27, 1897. Serial No. 634,118. (No model.) Patented in England January 20, 1894, No. 1,272.

*To all whom it may concern:*

Be it known that I, JOHN ALSTON HART, engineer, a subject of the Queen of Great Britain and Ireland, residing at Higher Bank, Adelaide Terrace, Blackburn, in the county of Lancaster, England, have invented certain Improvements in Apparatus for Ventilating, (for which I have obtained a patent in Great Britain, No. 1,272, dated January 20, 1894,) of which the following is a specification.

The object of my invention is to provide apparatus by means of which fresh air can be supplied to workshops or other places in a more efficient manner than hitherto and without injurious drafts or violent currents of air in the portions of the apartment which are occupied by the operatives or others.

Hitherto when relatively large quantities of fresh air drawn from the outside atmosphere have been discharged into the upper stratum of an apartment in the form of a relatively thin stratum or disk of fresh air, expanding and flowing quickly away from its center of distribution in a horizontal or approximately horizontal direction through or into the upper stratum of the atmosphere of an apartment, it has been found that when these quick-moving currents of fresh air come in contact with the air of the apartment a relatively large quantity or stream of apartment-air is induced to flow along with the fresh-air currents in directions away from its center of distribution, and the induced removal of this relatively large quantity or stream of apartment-air from the neighborhood of the center of the fresh-air discharge induces further currents of apartment-air to flow inward or toward the center of the neighborhood of the fresh-air discharge and injurious drafts or air-currents in the lower as well as the upper part of the apartment are caused. According to my invention I overcome this objection by providing means for controlling and diffusing a suitable proportion of the stream of fresh air from and around its center of distribution in the form of a complete or interrupted disk of fresh air, rapidly expanding in a horizontal direction into the upper stratum of the apartment-air, and also means for guiding and controlling and diffusing the other part of the fresh-air stream in directions partly vertical and partly inclined to a horizontal direction or partly axial and partly radial directions into those parts of the atmosphere of the apartment situated above or below or above and below and around or in relatively close proximity to the center of distribution of that part of the fresh-air stream which is discharged in a horizontal direction into the apartment, so that the whole or a part of the inductive power of the fresh-air stream moving rapidly from its center of distribution in a horizontal direction may be expended in inducing a part or the whole of the fresh-air stream which was discharged in semi-axial directions to move partly along with the horizontal currents and away from the center of distribution of the fresh-air stream, thus partly or entirely inclosing or shielding the quick-moving horizontal streams of fresh air with layers or films of fresh air moving at a relatively slow velocity, and so by reducing the inductive influence of the horizontal currents of fresh air upon the apartment-air reducing the air-currents in the inhabited stratum, and the efficiency of distribution is increased.

In the accompanying drawings I have shown various forms of apparatus by which my invention may be practically carried into effect.

Figure 19:
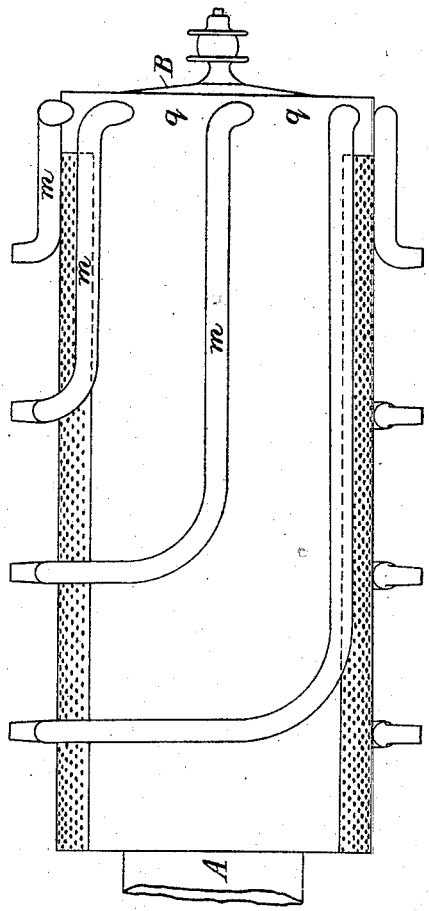
Figure 18:
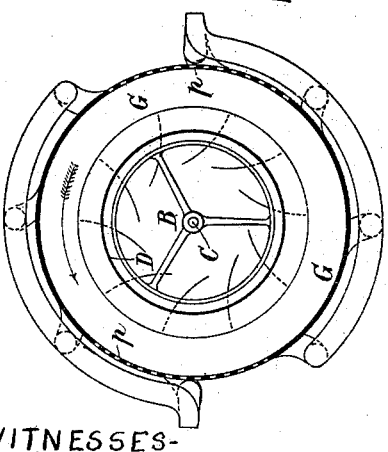

Figure 1 represents in vertical section, and Fig. 2 in half-horizontal section, a ventilating apparatus constructed according to my invention, the ventilating-fan being arranged to rotate in a horizontal plane. Figs. 3 to 16 illustrate various other constructions of ventilating apparatus according to my invention. Fig. 17 is a side view, partly in vertical section. Fig. 18 is a cross-section, and Fig. 19 is a plan, showing the invention applied to a ventilating-fan arranged to rotate in a vertical plane and more especially suitable for situations where vertical height is such as to render this arrangement more suitable than the other arrangements where the fan rotates in a horizontal plane; and Figs. 22 and 23 are respectively a side elevation, partly in section, and a plan view of a modification showing an arrangement for oscillating the cage.

Referring to Figs. 1 and 2, A represents a duct or air-inlet from the exterior of a building and communicating with a fan B with blades B², connected to a sleeve fitted to turn in a horizontal plane on a spindle C, carried by a boss which is connected by arms to a ring D, secured to the lower end of the duct A. Surrounding the duct A are two concentric cylinders $g\ h$ with an annular space between them open at top, a similar annular space open at top being left between the inner cylinder $g$ and the duct A. The blades or vanes B² of the fan B are curved, as shown in Fig. 2, and are secured to the top and bottom plates or annular disks $a$ and $b$, respectively. Surrounding the periphery of the fan are three stationary horizontal annular diaphragms or rings $c\ d\ e$, between which are provided curved vanes or deflecting-plates $f$. The diameter of the fan illustrated in these figures is assumed to be eighteen inches and the outlet for air between the plates $a$ and $b$ two inches in height, the other parts of the apparatus being relatively proportioned as shown. In the duct or air-inlet A there is provided a coil of pipe, as shown in Fig. 22, through which steam from any suitable source is caused to pass. It delivers a portion of the air between the rings $c\ d$ and up between the cylinders $g\ h$ out at the top thereof and a portion through the passage between the rings $d$ and $e$ in a horizontal or approximately horizontal direction into the upper part of the apartment. The vanes $f$ serve to direct the air into a more radial direction and reduce the whirling motion of the air in the apartment and increase the efficiency of the apparatus.

The air which passes up between the cylinders $g\ h$ may strike or pass near to the ceiling of the apartment and in part or altogether join the air-stream which is discharged horizontally through the rings $d$ and $e$.

In the arrangement shown in Figs. 3 and 4 an additional horizontal diaphragm or ring $c^2$ is provided around the periphery of the fan B and the cylinders $g^2\ h^2$ are provided below the fan. By this arrangement the air from the fan is distributed through three horizontal passages instead of through two only, as in the arrangement Figs. 1 and 2, and in a downward as well as in an upward direction through the annular space between the cylinders $g\ h\ g^2\ h^2$.

When the height of the apparatus above the floor is not sufficient to allow the downward air-current to expand and join the air horizontally projected, a deflector may be used below the outlet for the air from between the cylinders $g^2\ h^2$.

The arrangement may be modified by using in place of the cylinders $g$ and $g^2$ a perforated sheet, (similar to that used in the arrangement, Fig. 7,) fitted to the lower and upper ends, respectively, of the cylinders $h^2$ and $h$, to slow down and condition the currents of air which pass through it.

In the arrangement illustrated by Figs. 5 and 6 the horizontal diaphragms $d$ and $e$ are inclined toward each other, so as to maintain the pressure of air at their outer periphery, and instead of concentric cylinders surrounding the fan there are connected to the diaphragms $c\ c^2$ two conical rings or walls $g\ g^2$, connected at their upper and lower edges, respectively, to the upper and lower edges, respectively, of the perforated cylinders $h\ h^2$, thereby forming an annular triangular-shaped chamber or cage above and below the diaphragms $d$ and $e$. Between the diaphragms $c\ c^2$ and $d\ e$ are stationary vanes $f$ to stop or lessen the rotation of the air. The air from the fan is discharged partly through the passage between the diaphragms $d$ and $e$ directly into the apartment, being projected horizontally with considerable speed, and another part of the air passes between the diaphragms $d$ and $c$ and $e$ and $c^2$ into the triangular-shaped annular chambers or cage, and thence is diffused into the apartment by passing through the perforations in the cylinders $h\ h^2$.

In the arrangement illustrated by Figs. 7 and 8 the periphery of the fan B is surrounded by concentric cylinders $g$, $g^2$, and $h$, connected together at their upper and lower ends, respectively, by plates $l$, so as to form an annular chamber around the fan. The outer cylinder $h$ is provided with curved nozzles $m$, arranged in the line of direct blast from the fan, and through these nozzles a portion of the air passes in a horizontal direction into the apartment with considerable speed, another portion of the air from the fan passing into the apartment in a diffused condition through the perforations in the cylinder $h$. A sample of the perforated material for the cylinder $h$ is shown in Fig. 8ᴬ.

In the arrangement shown in Figs. 9 and 10 the cylinder $g$, hereinbefore described, is dispensed with, the fan being surrounded by or inclosed in a drum or cage $h$, having a perforated periphery, (with perforations similar to those of the cylinder $h$ in Figs. 7 and 8,) through the perforations of which the air passes into the apartment. In Fig. 9 a ring of stationary curved blades or deflectors $f$, (between the rings $c$ and $e$,) similar to those hereinbefore described, is arranged around the periphery of the fan to direct the air in a radial direction and so increase the efficiency of the fan B. The perforations may be the same throughout the cylinder $h$; but in order to give a better distribution of the air in the cylinder $h$ directly opposite the periphery of the fan a ring $h^3$ may be attached to or formed in one with the interior of the cylinder $h$ for the purpose of increasing the length of the perforations to about three-sixteenths of an inch. The perforations through the ring and the cylinder at this part may be made closer together and of larger diameter—say three-sixteenths of an inch—so as to serve as forcing-jets for the centrally horizontally projected currents. In place of these larger perforations in the periphery of the drum nozzles $m$ may be provided on the drum, as shown in Figs. 11 and 12, the said nozzles being curved in the direction of the blast from the fan, the ring of curved blades or deflecting-plates hereinbefore described being dispensed with in this arrangement.

In the arrangement shown in Figs 13 and 14 a portion of the air from the fan is conducted into a triangular annular chamber $o$, surrounding the lower part of the air-duct A, the said chamber being formed by an outer perforated cylinder or cage $h$ with perforations, as in Figs. 7 and 8, and an inner conical wall $g$, connected together at their upper ends, the lower end of the conical wall $g$ being connected to the annular diaphragm or ring $c$, which surrounds the periphery of the fan and which forms, with the diaphragm or ring $c$, a channel by which the air is conducted partly into the triangular chamber $o$ and partly into upwardly curved or projecting nozzles $m$, extending outside the cylinder $h$ to about the center of the height. The air is projected with considerable speed through the nozzles $m$ and is diffused and supplied above and below it by passing through the cage $h$.

In the arrangement shown in Figs. 15 and 16 the air-distributing passages (like those shown in Figs. 13 and 14) are arranged above the fan. The air from the fan enters an annular chamber $o$, formed by two conical concentric casings $n$ $n^2$ and horizontal diaphragms or rings $c$ and $e$ at the bottom and similar diaphragms or rings $c^3$ $e^3$ at top. This annular chamber $o$ communicates with another annular chamber $o^2$, formed by two conical walls $g$ $g^2$ and an outer perforated cylinder or cage $h$, one end of each of the conical walls $g$ $g^2$ being connected, respectively, to the horizontal diaphragms $c^3$ $e^3$, their other ends being connected, respectively, to the upper and lower edge of the outer perforated cylinder or cage $h$. Nozzles $m$ are provided in the outer cylinder $h$ directly opposite where the chamber $o$ opens into the chamber $o^2$, through which nozzles a portion of the air passes with considerable speed into the apartment, while the other portion of the air passes into the apartment through the perforations in the cylinder $h$, so as to be diffused and supplied above and below the jets passing from the nozzles $m$.

In the arrangement illustrated in Figs. 17, 18, and 19 the fan B is arranged to rotate in a vertical plane and is mounted on a spindle C, carried by a ring D, fixed to the delivery end of the air-duct A. The fan and delivery end of the said air-duct are surrounded by a cylinder G, portions $p$ of which are perforated on diametrically opposite sides. The arrangement of the perforations may be as in Fig. 8$^A$. The part of the said cylinder which surrounds the periphery of the fan and for a short distance beyond is unperforated, as shown at $q$, and through this unperforated part pipes $m$ open directly opposite the periphery of the fan. These pipes $m$ are carried along and at their other ends open along the sides of the cylinder at or about midway of the perforated portion at each side, half the pipes $m$ opening along one side of the cylinder and the other half along the other side. The said pipes $m$ form the nozzles by which horizontal currents of considerable speed are introduced into the apartment, while fresh diffused air to supply the inductive effect of the said jets is introduced into the apartment by the perforated sides of the cylinder in proximity to the said jets. The air-duct may be provided in the interior with heating or cooling pipes, such as the coil I have hereinbefore described, for example, for the purpose of heating or cooling the air in its passage to the fan. The nozzles or air-jets $m$ from the cage $h$ extend through the cage F, and to the outer ends thereof there may be connected swiveling or hinged nozzles $m^2$, the said hinged nozzles being retained in their angular or adjusted position by clamping-screws $m^3$ or otherwise.

Figure 20:
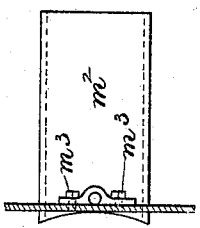
Figure 21:
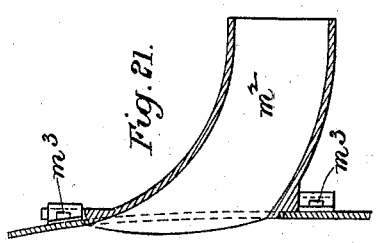

Figs. 20 and 21 represent, in elevation and sectional plan, the swiveling nozzle as hinged to the cage $h$, the said nozzle being provided with trunnions turning in straps which can be tightened by the screws $m^3$.

If desired, the cage and jets hereinbefore described instead of being connected to the air-duct A may be caused to vibrate or oscillate or to be vibrated or oscillated, as shown in Figs. 22 and 23, to direct and distribute the air-currents to all points. One method of accomplishing this is by slinging or suspending them by chains or wires $x$ and arranging them so as to be relatively free to move as required, so that the whirling air-currents inside them may move them partly around, in, or about a horizontal plane and slightly raise them in a vertical direction and causing the suspending chains or wires to be moved to the necessary degree from their vertical position, after which they will swing back and around in opposite directions after the manner of a pendulum, oscillating mainly about and around a horizontal plane. A slight clearance is of course provided at $y$ and $z$ to allow of free oscillation, and by these oscillations the distribution and diffusion of the air-currents is improved.

Q is a steam-coil arranged in the air-duct A for warming the air-current.

Having now particularly described and ascertained the nature of my said invention and in what manner the same is to be performed, I claim—

1. Apparatus for the purposes described, consisting of a fan or equivalent apparatus for inducing currents of air and an air-inlet therefor, in combination with a cage or casing around the said fan, and having free air-outlets into the apartment in a horizontal, or approximately horizontal direction, for air-currents of high speed, and means for discharging diffused currents of air into the apartment in proximity to the said outlets, whereby the currents of air induced by the high-speed air-currents are wholly or in the main part the said diffused currents of air, thereby preventing objectionable air-currents in the apartment, substantially as hereinbefore explained.

2. In apparatus for the purpose described, a fan or equivalent means, for inducing currents of air, and an air-inlet therefor, in combination with a cage having openings through which the air is caused to pass into the apartment, the said cage being supported so as to be free to vibrate or oscillate, substantially as hereinbefore described.

In testimony whereof I have signed my name to this specification in the presence of two subscribing witnesses.

J. A. HART.

Witnesses:
JOHN BRIGGS,
JOSEPH GILL.